(12) United States Patent
Garcia

(10) Patent No.: US 7,365,640 B2
(45) Date of Patent: Apr. 29, 2008

(54) TRANSPORTABLE POLICE VEHICLE DECOY

(76) Inventor: Teddy Garcia, 784 Blanding Blvd., Suite 108, Orange Park, FL (US) 32065

( * ) Notice: Subject to any disclaimer, the term of this patent is extended or adjusted under 35 U.S.C. 154(b) by 186 days.

(21) Appl. No.: 11/290,092

(22) Filed: Nov. 30, 2005

(65) Prior Publication Data

US 2006/0175774 A1   Aug. 10, 2006

Related U.S. Application Data

(60) Provisional application No. 60/646,058, filed on Jan. 21, 2005.

(51) Int. Cl.
*G08B 21/00* (2006.01)

(52) U.S. Cl. .................... 340/431; 340/936; 40/590; 40/591; 40/427; 40/124.02; 40/124.03

(58) Field of Classification Search ............... 304/431, 304/915; 40/584, 590, 591, 427, 124.01–124.03; 340/431, 936
See application file for complete search history.

(56) References Cited

U.S. PATENT DOCUMENTS

| | | | | |
|---|---|---|---|---|
| 6,046,686 A | * | 4/2000 | Mitchell et al. | ............ 340/936 |
| 2001/0054970 A1 | * | 12/2001 | Jones | .......................... 340/915 |

FOREIGN PATENT DOCUMENTS

GB   2245402 A   *   1/1992

* cited by examiner

*Primary Examiner*—Benjamin C. Lee
*Assistant Examiner*—Shirley Lu
(74) *Attorney, Agent, or Firm*—Thomas C. Saitta

(57) ABSTRACT

A transportable police vehicle decoy having a life-like, life-size visual image of a police vehicle mounted onto a trailer for transportability, the wheels of the trailing appearing to be the wheels of the police vehicle shown in the image. Operational emergency lights are positioned in the proper location on the visual image and can be activated by speed detection devices when a speeding vehicle approaches.

19 Claims, 6 Drawing Sheets

TRANSPORTABLE POLICE VEHICLE DECOY

This invention claims the benefit of U.S. Provisional Patent Application Ser. No. 60/646,058, filed Jan. 21, 2005.

BACKGROUND OF THE INVENTION

This invention relates generally to the field of devices used to control and monitor the travel speed of vehicles on a thoroughfare, and more particularly to such devices used by law enforcement and traffic control, such as warning signs, radar guns and other speed detecting devices, speed indicator signs, etc.

Monitoring vehicle speeds on the roadways and influencing drivers to maintain safe speeds and speeds within set speed limits is a necessary activity for law enforcement personnel, as it is well known that a significant number of drivers will exceed posted speed limits, thereby posing a risk to themselves, their passengers, other vehicle occupants and pedestrians. Law enforcement personnel use many tools to accomplish this goal, ranging from passive means such as simple billboard messages at one end of the spectrum to active means such as speed traps using hidden radar guns, airplane surveillance and other detection devices on the other. Law enforcement officials also utilize techniques in the mid-range, such as the use of speed monitoring and display devices temporarily placed along roadways, where the speed of each approaching vehicle is displayed in large numbers to the oncoming driver. Another technique is to park an empty law enforcement vehicle alongside the roadway, sometimes with a dummy stationed in the driver's seat. This latter technique is very effective in causing drivers to reduce their speed, since approaching drivers cannot determine whether or not the parked vehicle is manned with an officer operating a radar gun. However, the use of a parked law enforcement vehicle represents an expensive approach to the problem, since the parked vehicle is removed from active use.

It is an object of the invention to provide a device that combines benefits from many of the speed monitoring devices and techniques discussed above, while at the same time obviating many of the problems associated with certain methods and devices. It is an object to provide a device that can be utilized in various active or passive formats, such that the device can serve as a mere warning device, can serve as an interactive warning device that detects the speed of approaching vehicles and displays the speed or produces visible alerts, or can serve as a controlling device that detects the speed of approaching vehicles and alerts officers to stop vehicles that are in violation of the speed limit. It is an object to provide such a device that produces the desired response obtained from drivers sighting a parked police vehicle without incurring the costs resulting from the use of idle police vehicles. It is an object to provide such a device that is relatively inexpensive to produce and is easily transportable to various locations.

SUMMARY OF THE INVENTION

The invention is a transportable police vehicle decoy or speed monitoring device that is intended to influence public driving habits, and in particular to influence motorists to drive within the posted speed limits. The device is mobile and comprises a trailer frame with wheels, such that the device can be pulled behind a vehicle and positioned at desired locations along roadways, and a visual display having the appearance of a real police vehicle.

The visual display comprises an enlarged, preferably life-size, generally two-dimensional reproduction of an actual police vehicle, preferably a photograph or an extremely realistic artistic reproduction. The photograph or reproduction is preferably taken or drawn at an angle and is preferably mounted on the trailer frame such that the functioning wheels of the trailer appear to be the wheels of the police vehicle when viewed from the approach direction down the roadway. Preferably, the visual display is enhanced by incorporating working vehicle and/or emergency lights into or on the display, positioned so as to correspond with the location of the image of the actual lights on the photographed police vehicle. Speed detection equipment may be incorporated such that upon detection of a vehicle traveling in excess of the speed limit, the lights are activated for a short period of time, thus causing the motorist to believe it is an actual police vehicle, and speed detection equipment may be provided with communication means to alert actual police officers waiting to make traffic stops beyond the visual display.

Preferably, the visual display comprises a relatively thin and lightweight material, such that the display can be easily removed or, most preferably, folded into one or more segments for transportation. For decoy devices having operational equipment, such as lights, electronic displays, radar detection devices and the like, batteries are provided for electrical power, and may also be provided with solar panels to recharge the batteries or provide direct poser to the working components.

DETAILED DESCRIPTION OF THE INVENTION

Figure 1:
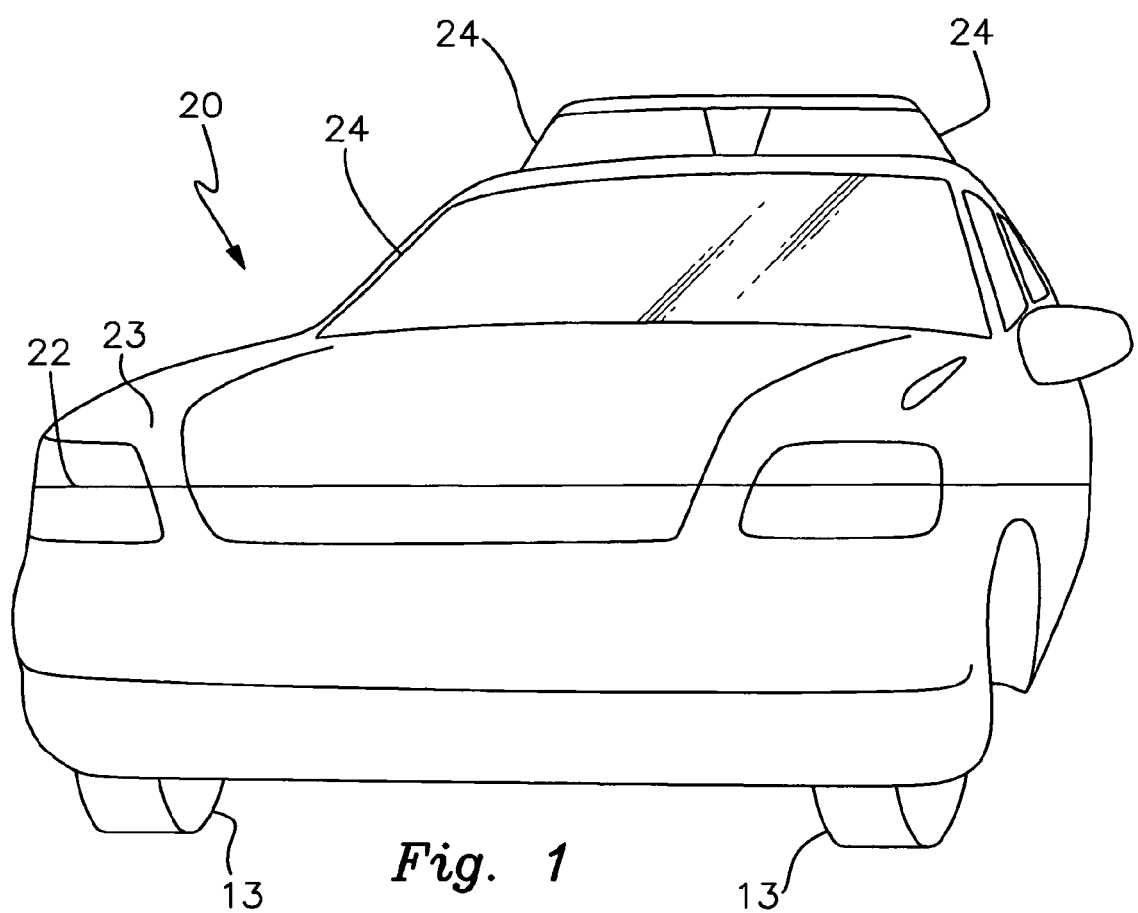
FIG. 1 is a front view of the police decoy device, illustrating a representative depiction of a police vehicle as the visual display.

With reference to the drawings, the invention will now be described in detail with regard for the best mode and the preferred embodiment. In a general sense the invention is a transportable police vehicle decoy device, the device comprising a wheeled trailer and a visual display member, the visual display member depicting a real police vehicle.

Trailer component 10 can be of any configuration suitable for towing behind a vehicle, and is preferably of relatively low weight such that it can be towed by standard police vehicles. As shown, trailer 10 comprises a frame 11 with a hitch 12 for connection to the tow vehicle, and a pair of wheels 13. Platforms 15 are provided to support batteries 31, speed detection means 30 and other items as desired.

Connected to trailer 10 is the visual display 20. Visual display 20 comprises a relatively thin and preferably lightweight panel member or frame 21 that provides structural support and rigidity to the vehicle image member 23. The panel member 21 is disposed at or toward the rear of the trailer frame 11 with its lower edge suspended a distance above the ground, such that the lower portion of the trailer wheels 13 are visible beneath the visual image 23 when viewed from the rear of the trailer 10. Display brace members 14 are provided to support the panel member 21 in a generally vertical position.

Mounted to the panel member 21 is visual image 23, which comprises a life-like and preferably life-size rendering or representation of a police vehicle. Preferably, visual image 23 is an enlarged photograph of a police vehicle, taken at a slight angle from either the front or the rear such that the side of the vehicle also appears in the picture. In this manner the visual image 23 will more readily appear to be three-dimensional to oncoming traffic. Preferably the outline or perimeter of panel member 21 is shaped to correspond to the outline of the actual police vehicle shown in the visual image 23. Visual image 23 is preferably mounted such that the wheels 13 of the trailer 10 correspond in location to the position of the wheels (preferably not included in the photograph) of the police vehicle, thereby further increasing the three-dimensional illusion.

A suitable material for forming the panel member 21 is with a material sold under the brand name COROPLAST. This material is a lightweight polymer structure formed as two parallel sheet members with a large number of parallel internal brace members or webs extending between the two sheet members to impart rigidity. The visual image 23 may be joined to the panel member 21 or printed directly thereon. Alternatively, any panel material of suitable rigidity, durability, weight and like characteristics may be employed, such as metal, wood or plastic.

Figure 2:
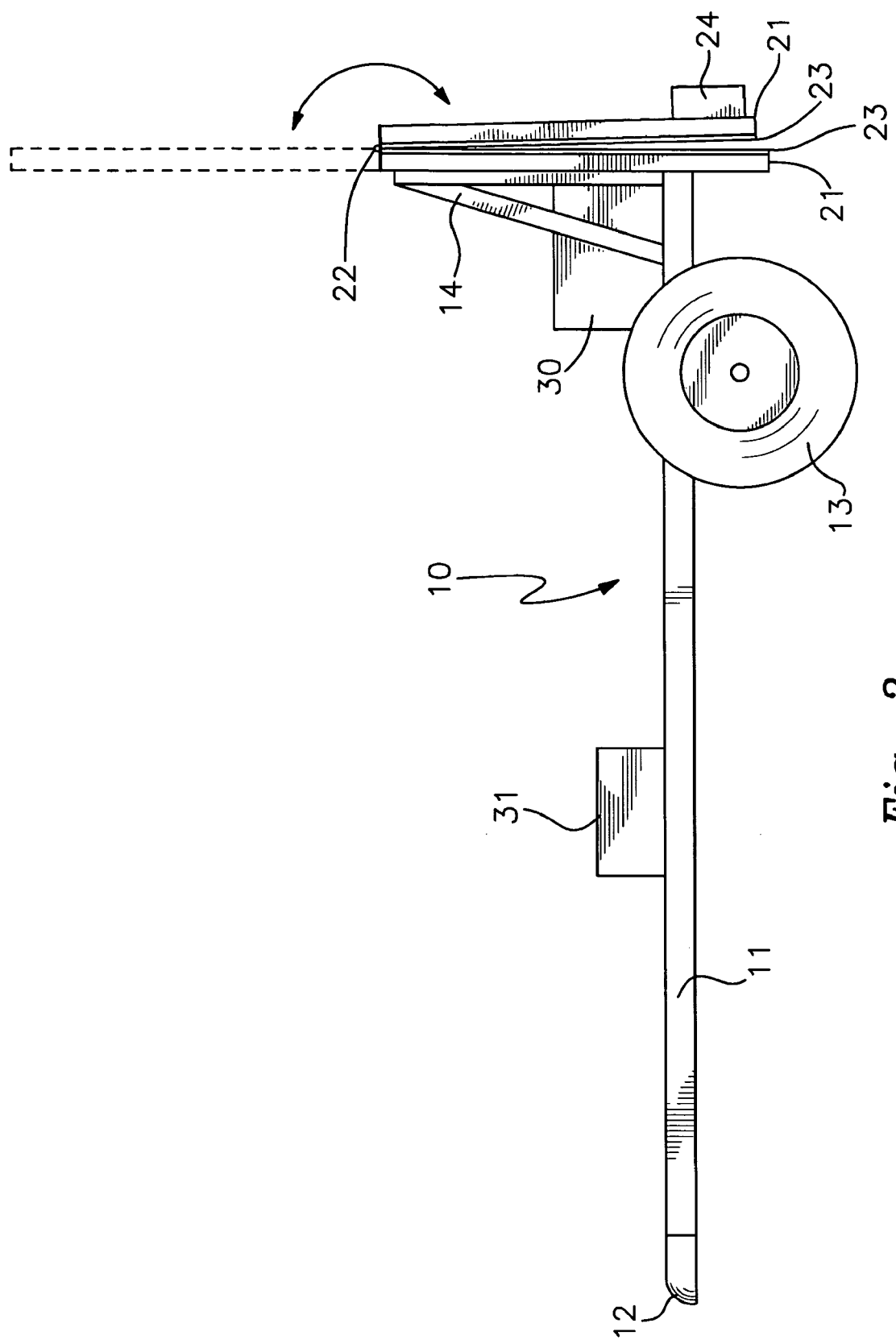
FIG. 2 is a side view of the device, showing the visual display partially folded rearward for transport.
Figure 4:
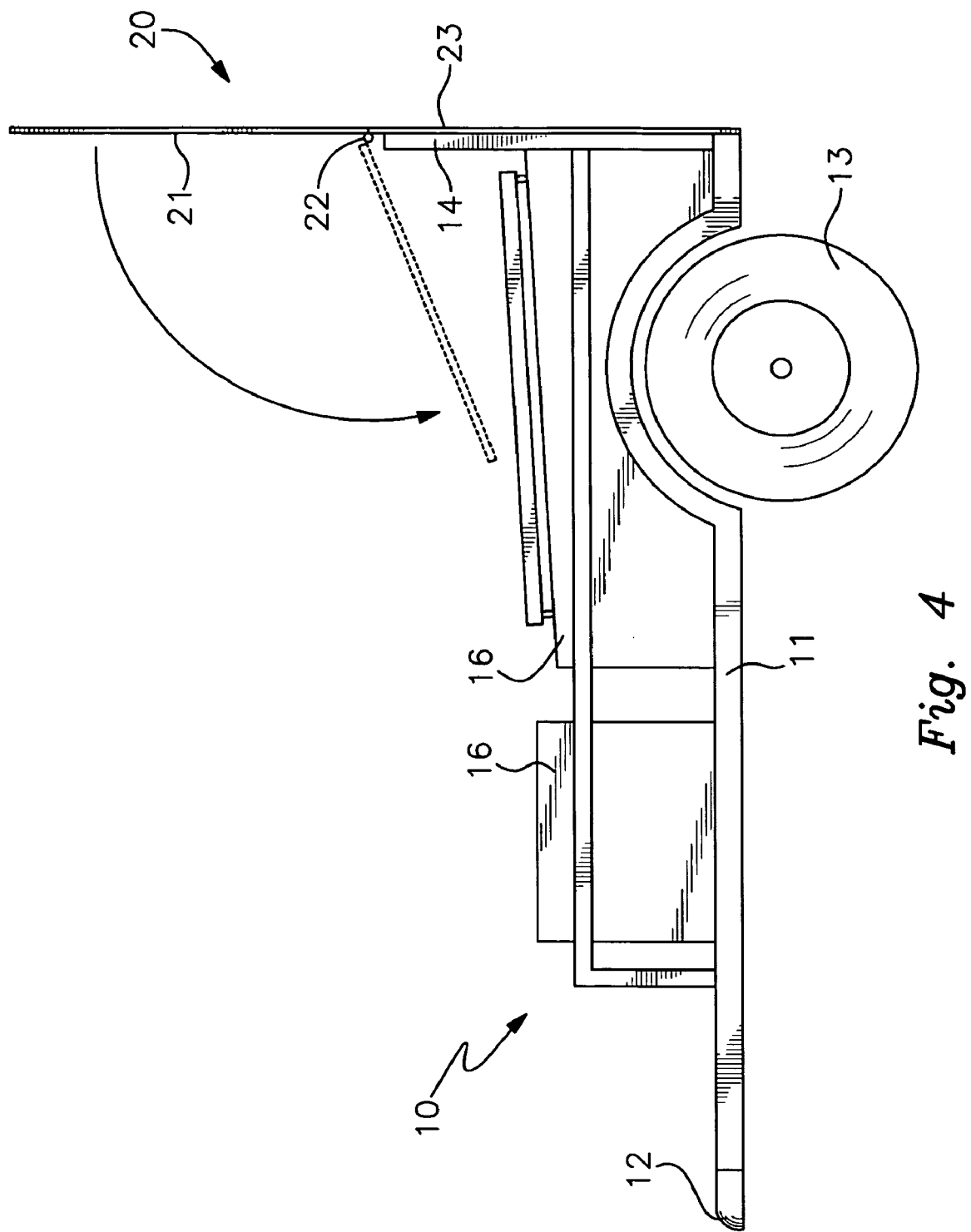
FIG. 4 is a side view of an alternative embodiment of the device, showing the visual display partially folded forward.
Figure 5:
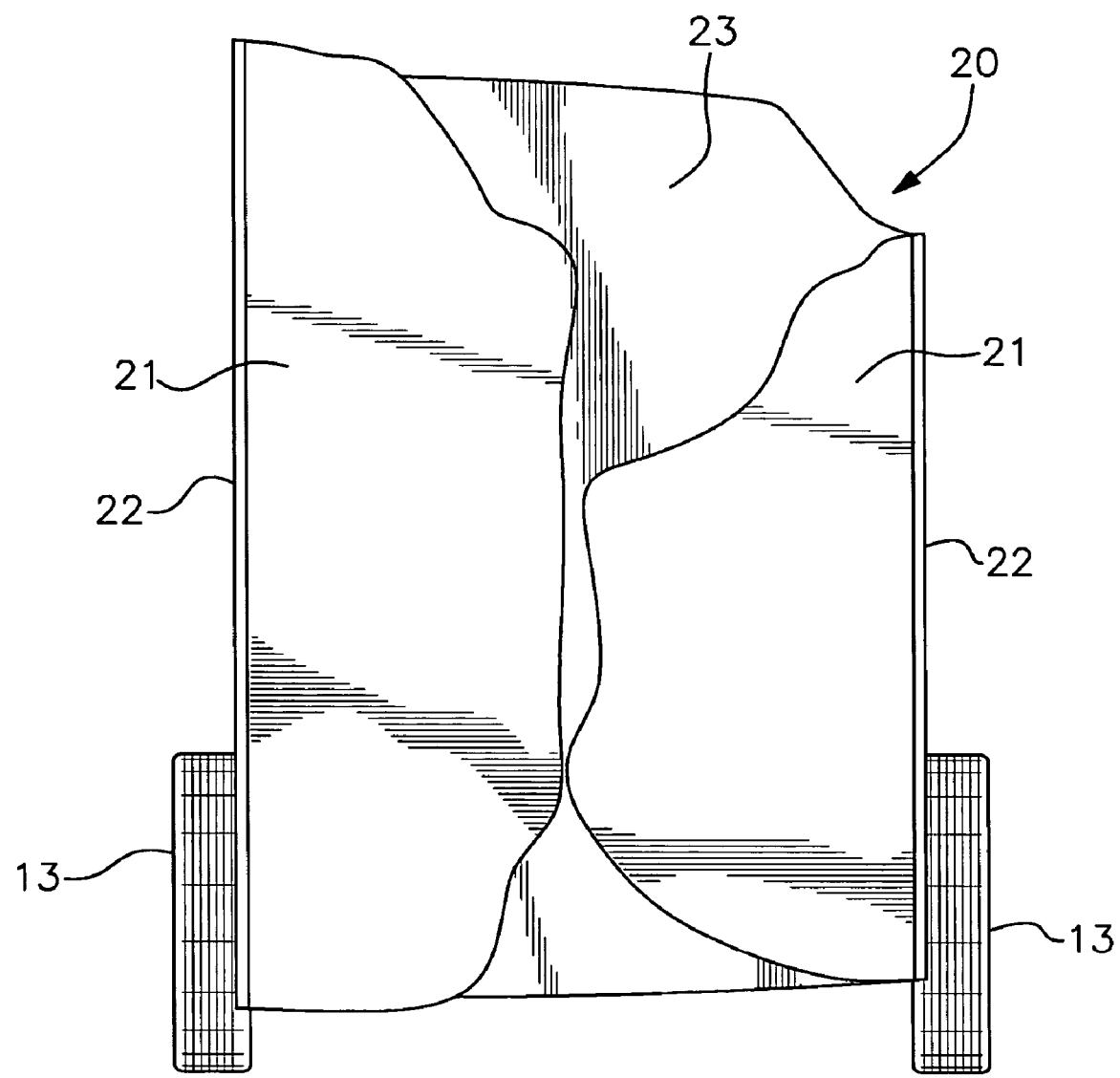
FIG. 5 is a rear view of another alternative embodiment of the device, showing the visually display with vertical hinges and lateral sections folded inward upon the middle section.

For ease of transport, the combination panel member 21 and visual image 23 may be removable from the trailer 10, as a single piece or in sections, or preferably may be provided with hinge members 22 such that portions of the panel member 21 and visual image can be folded to reduce its surface area, or folded out of vertical to reduce wind resistance. For example, the combination panel member 21 and visual image 23 may be provided with a horizontal hinge 22 such that the upper portion of the panel member 21 and visual image 23 may be folded rearward for transport, as shown in the embodiment of FIG. 2, or forward, as shown in the embodiment of FIG. 4. In still another alternative embodiment shown in FIG. 5, the combination panel member 21 and visual image 23 is provided with one or more vertically disposed hinge members 22, such that the lateral sections are folded inwardly upon the middle section. If COROPLAST brand material is used to form the panel member 21, one sheet member can be sliced horizontally, allowing the other sheet member to fold upon itself to create an integral hinge 23 without the need to attach a metal or plastic piano hinge or the like.

To increase the versatility of the decoy device, it is preferable that non-static or interactive devices be incorporated. For example, operational emergency lights 24 corresponding in shape and size may be positioned on or extending through the panel member 21 such that the lights 24 are located correctly on the visual image 23 so as to correspond to the location of the emergency lights in the photograph. A battery 31, possibly recharged by solar panels 32, is provided such that the lights 24 may be activated to draw further attention to the visual image 23. Most preferably, a speed detection means 30, such as a radar gun or the like, is incorporated such that the lights 24, and possible audible sirens, are activated for a short period of time when a vehicle traveling in excess of the speed limit is detected by the speed detection means 30.

The presence of an operational radar gun or other speed detection means 30 will also serve to slow traffic, since any vehicles containing radar detectors will pick up the signal. The speed detection means 30 may also comprise communication means, whereby detection of a speeding vehicle could be relayed to actual police officers in stand-by vehicles, with or without activation of the emergency lights 24 in the visual display 20, such that speeding motorists could be pulled over and ticketed.

Figure 3:
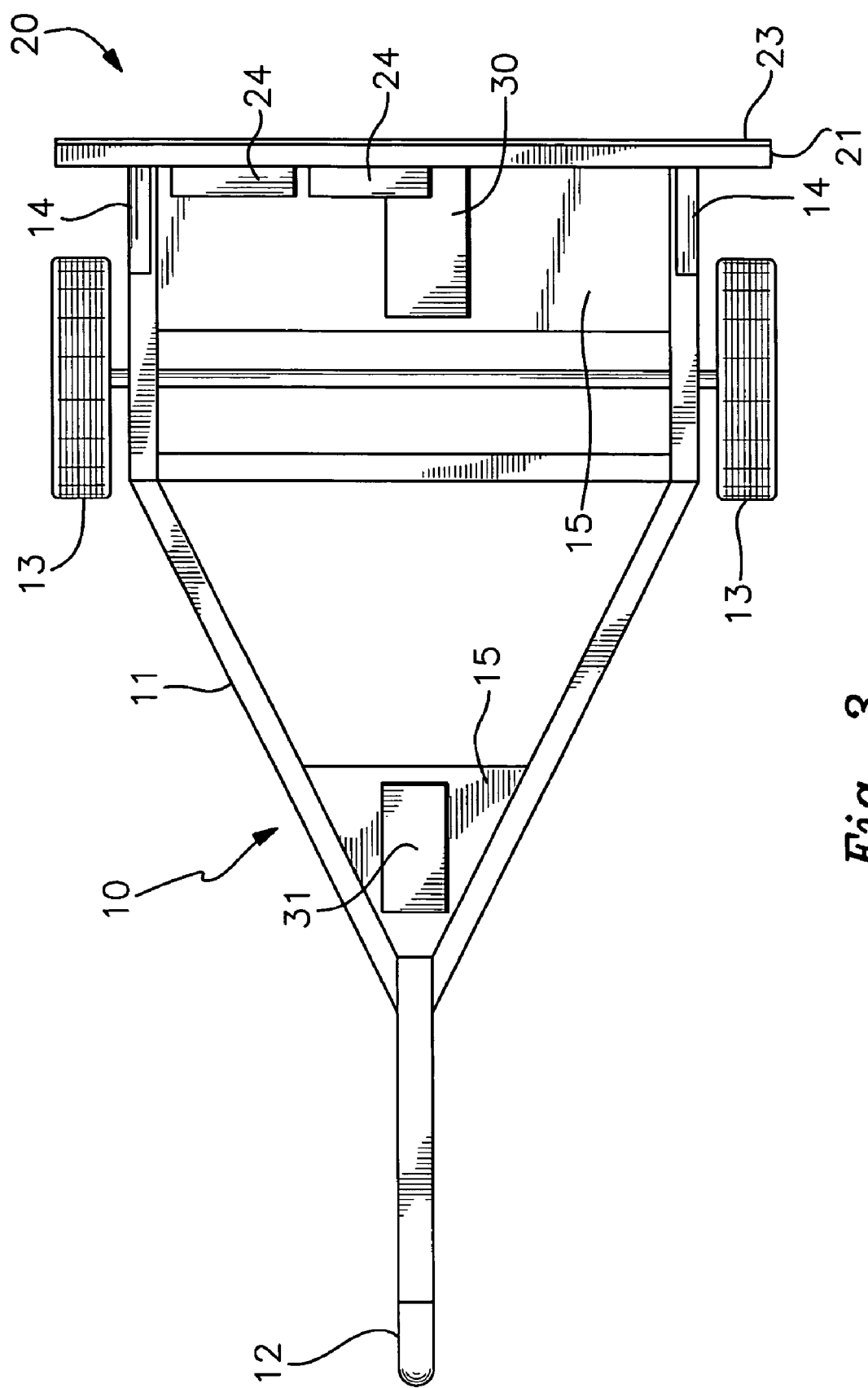
FIG. 3 is a top view of the device.
Figure 6:
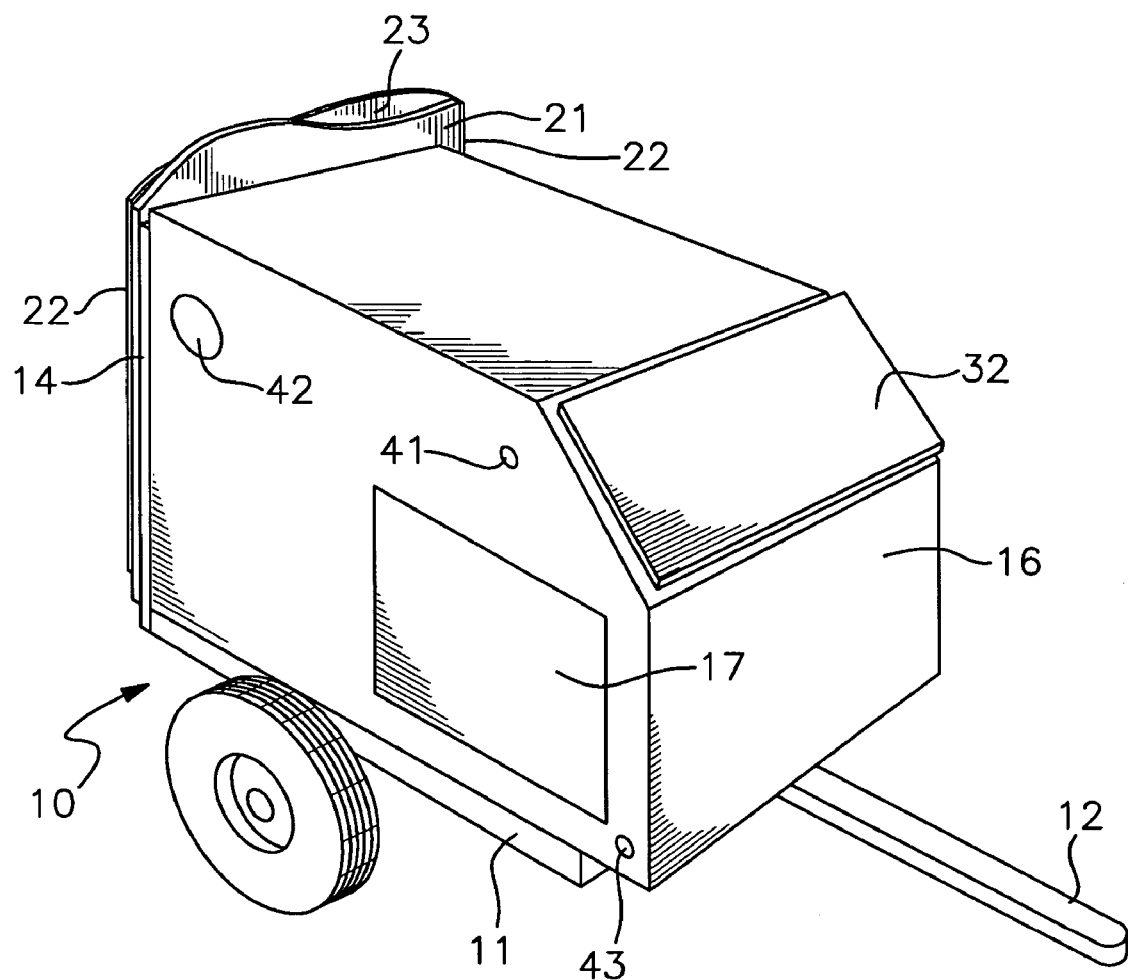
FIG. 6 is a side view of the embodiment of FIG. 5, showing an enclosure housing as mounted onto the trailer.

The power and operational components may be mounted to the trailer 10 in an exposed manner, as seen in FIGS. 2 and 3, or some or all of the power and operational components may be enclosed in one or more housings 16, as shown in FIGS. 4 and 6, for security and protection from the elements. The housing 16 will be provided with access means 17, such as a door or removable panel, such that the power and operational components may be accessed as required. Additional components such as a battery charge meters 41, vents 42 or electrical plugs 43 to recharge the batteries 31 may also be provided.

The particular police vehicle used for the visual image 23 is best chosen to correspond to the type of police vehicle in use in a particular area, thereby adding to the authenticity of the decoy.

I claim:

1. A police vehicle decoy device comprising:
   a trailer towable behind a vehicle and comprising a pair of wheels;
   a visual display comprising a panel member mounted to said trailer and a vehicle image mounted to said panel member, said vehicle image comprising a representation of a police vehicle; and
   wherein said vehicle image lacks a representation of the wheels of said police vehicle, and wherein said vehicle image is positioned on said panel member such that said wheels of said trailer appear to be the wheels of said vehicle image when said visual display is viewed.

2. The device of claim 1, wherein said vehicle image comprises a representation of the front and a side of the police vehicle.

3. The device of claim 1, further comprising lights mounted on said visual display.

4. The device of claim 3, wherein said vehicle image comprises a representation of police vehicle lights, and wherein said lights are located on said visual display at the position of said vehicle image lights.

5. The device of claim 4, further comprising a battery.

6. The device of claim 5, further comprising speed detection means.

7. The device of claim 6, said speed detection means comprising a radar gun.

8. The device of claim 6, wherein said speed detection means activates said lights.

9. The device of claim 6, further comprising communication means, wherein said speed detection means initiates a communication through said communication means.

10. The device of claim 6, further comprising a solar panel for recharging said batteries.

11. The device of claim 10, further comprising a housing mounted onto said trailer.

12. The device of claim 1, wherein said visual display further comprises at least one hinge member, wherein said visual display may be folded into sections for transport.

13. A police vehicle decoy device comprising:

a wheeled trailer comprising at least a pair of wheels;

a visual display comprising a panel member mounted to the rear of said trailer and a visual image mounted on said panel member, said visual image comprising a photographic representation of a police vehicle showing the front and side of the police vehicle, wherein said visual image is mounted on said panel member such that said wheels of said trailer are located beneath said visual image so as to provide the illusion when said visual image is viewed that said trailer wheels are the wheels of said police vehicle visual image.

14. The device of claim 13, further comprising a battery and operational lights, said lights being located relative to said visual image such that said lights provide the illusion when said visual image is viewed that said lights are the lights of said police vehicle image.

15. The device of claim 14, further comprising speed detection means, wherein said speed detection means control the operation of said lights.

16. The device of claim 15, further comprising communication means, wherein said communication means relays data from said speed detection means to police officers.

17. The device of claim 14, further comprising a solar panel to recharge said battery.

18. The device of claim 13, wherein said visual image is life-size.

19. The device of claim 17, wherein said visual display comprises at least one hinge member, wherein said visual display may be folded to reduce its size during transport.

* * * * *